United States Patent
Park et al.

(10) Patent No.: US 11,983,248 B2
(45) Date of Patent: May 14, 2024

(54) APPARATUS AND METHOD FOR CLASSIFYING CLOTHING ATTRIBUTES BASED ON DEEP LEARNING

(71) Applicant: Electronics and Telecommunications Research Institute, Daejeon (KR)

(72) Inventors: Chan-Kyu Park, Daejeon (KR);
Do-Hyung Kim, Daejeon (KR);
Jae-Hong Kim, Daejeon (KR);
Jae-Yeon Lee, Daejeon (KR); Min-Su Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 310 days.

(21) Appl. No.: 17/496,588

(22) Filed: Oct. 7, 2021

(65) Prior Publication Data
US 2023/0053151 A1 Feb. 16, 2023

(30) Foreign Application Priority Data
Aug. 13, 2021 (KR) .......................... 10-2021-0107174

(51) Int. Cl.
G06F 18/2431 (2023.01)
G06F 18/20 (2023.01)
(Continued)

(52) U.S. Cl.
CPC ........ *G06F 18/2431* (2023.01); *G06F 18/214* (2023.01); *G06F 18/254* (2023.01);
(Continued)

(58) Field of Classification Search
CPC ........ G06N 3/08; G06N 3/0464; G06V 10/82; G06V 10/454; G06V 10/764;
(Continued)

(56) References Cited

U.S. PATENT DOCUMENTS

2020/0302176 A1* 9/2020 Yang .......................... G06F 7/57
2020/0356854 A1* 11/2020 Li .............................. G06N 5/04
2021/0303927 A1* 9/2021 Li .......................... G06V 10/764

FOREIGN PATENT DOCUMENTS

CN 111931643 A 11/2020
KR 1020100043883 A 4/2010
(Continued)

OTHER PUBLICATIONS

Ziwei Liu et al., "DeepFashion: Powering Robust Clothes Recognition and Retrieval with Rich Annotations," CVPR, 2016, pp. 1096-1104.

*Primary Examiner* — Margaret G Mastrodonato
(74) *Attorney, Agent, or Firm* — William Park & Associates Ltd.

(57) ABSTRACT

Disclosed herein are an apparatus and method for classifying clothing attributes based on deep learning. The apparatus includes memory for storing at least one program and a processor for executing the program, wherein the program includes a first classification unit for outputting a first classification result for one or more attributes of clothing worn by a person included in an input image, a mask generation unit for outputting a mask tensor in which multiple mask layers respectively corresponding to principal part regions obtained by segmenting a body of the person included in the input image are stacked, a second classification unit for outputting a second classification result for the one or more attributes of the clothing by applying the mask tensor, and a final classification unit for determining and outputting a final classification result for the input image based on the first classification result and the second classification result.

16 Claims, 8 Drawing Sheets

(51) Int. Cl.
    *G06F 18/214*     (2023.01)
    *G06F 18/25*      (2023.01)
    *G06N 3/08*       (2023.01)
    *G06T 3/4046*     (2024.01)
    *G06T 7/11*       (2017.01)
    *G06V 10/44*      (2022.01)
    *G06V 10/94*      (2022.01)
    *G06V 40/10*      (2022.01)

(52) U.S. Cl.
    CPC ............. *G06F 18/285* (2023.01); *G06N 3/08* (2013.01); *G06T 3/4046* (2013.01); *G06T 7/11* (2017.01); *G06V 10/449* (2022.01); *G06V 10/95* (2022.01); *G06V 40/10* (2022.01); *G06T 2207/20076* (2013.01); *G06T 2207/20081* (2013.01); *G06T 2207/20084* (2013.01); *G06T 2207/30196* (2013.01)

(58) Field of Classification Search
    CPC .. G06F 18/2431; G06F 18/254; G06F 18/214; G06T 2207/20076; G06T 2207/20081; G06T 2207/20084; G06T 2207/10024; G06T 2207/30196; G06T 3/4046; G06T 7/11
    See application file for complete search history.

(56) References Cited

FOREIGN PATENT DOCUMENTS

| | | |
|---|---|---|
| KR | 1020160096460 A | 8/2016 |
| KR | 102053036 B1 | 12/2019 |

\* cited by examiner

APPARATUS AND METHOD FOR CLASSIFYING CLOTHING ATTRIBUTES BASED ON DEEP LEARNING

CROSS REFERENCE TO RELATED APPLICATION

This application claims the benefit of Korean Patent Application No. 10-2021-0107174, filed Aug. 13, 2021, which is hereby incorporated by reference in its entirety into this application.

BACKGROUND OF THE INVENTION

1. Technical Field

The following embodiments relate to technology that recognizes and classifies the types and attributes of various clothes worn by persons in camera images or pictures based on deep learning.

2. Description of the Related Art

Learning data required to generate an existing clothing attribute recognition model is configured such that the types of upper garments and lower garments worn by persons in images, such as shirts, jackets, jumpers, vests, dresses, coats, pants, and skirts, and clothing attributes including colors, patterns, seasonal styles, sleeve lengths, etc. of respective clothing items are labeled. A deep-learning-based artificial neural network model that is capable of classifying the clothing attributes learned based on such learning data may classify the types of upper garments and lower garments worn by persons and various clothing attributes thereof.

Each person occasionally wears only a T-shirt as an upper garment, but he or she wears several clothing items in layers in most cases. Therefore, when the person wears upper garments corresponding to an outer layer and an inner layer one over another, the inner layer is exposed together with the outer layer in most cases, except for the case where the inner layer is hidden in the state in which the outer layer is completely buttoned up. In this case, because the clothing attribute recognition model, which is trained with existing clothing attribute data, must classify only one type and one attribute, it may classify two types of upper garments and attributes having the highest probability value. Here, the results of classification may be results corresponding to the outer layer or results corresponding to the inner layer. Further, even if the results of classification are supposed to be the results of classification of the outer layer, they may indicate results in which several clothing items corresponding to the inner layer are combined and classified, and vice versa. These results prevent accurate information from being provided in various services in which clothing attribute recognition is useful, thus deteriorating the quality of service.

In an example of a service by which styles of clothes similar to those in a given image are searched for, when a user wears clothes in layers corresponding to an outer layer and an inner layer, existing technology searches for a clothing combination corresponding to an inner layer and an outer layer without criteria being established, upon searching for clothes in a similar style.

For this operation, it is preferable to use data including labels of all pieces of information about outer-layer clothing and inner-layer clothing as clothing-learning data initially used for training, but it is typical for the clothing-learning data to include labels related to a single upper garment, which mainly pertains to outer-layer clothing. In order to classify clothing so that all of outer-layer clothing items and inner-layer clothing items corresponding to upper garments are identified, pieces of data for which labels of outer-layer clothing items and inner-layer clothing items are tagged are required from the beginning of training. Unless these pieces of data are present, new learning data must be created.

Because this is a task that imposes a large burden, a method for additionally tagging labels of the types and attributes of outer-layer clothing and inner-layer clothing onto existing clothing-learning data and then supplementing the existing data may be selected. However, this task is troublesome in that a labeling worker is required to manually reinforce a large amount of learning data with data labels.

SUMMARY OF THE INVENTION

An embodiment is intended to improve the results of classification of clothing attributes for an input image in which outer-layer clothing and inner-layer clothing are worn in layers.

An embodiment is intended to propose a deep-learning-based model that is capable of accurately classifying the types and attributes of outer-layer clothing and inner-layer clothing, without additionally tagging labels for distinguishing outer-layer clothing from inner-layer clothing onto existing data for training a model which classifies clothing attributes.

An embodiment is intended to propose a new weakly supervised learning method that is capable of supplementing insufficient information labels through another method while using existing clothing attribute data without change.

In accordance with an aspect, there is provided an apparatus for classifying clothing attributes based on deep learning, including memory for storing at least one program, and a processor for executing the program, wherein the program includes a first classification unit for outputting a first classification result for one or more attributes of clothing worn by a person included in an input image, a mask generation unit for outputting a mask tensor in which multiple mask layers respectively corresponding to principal part regions obtained by segmenting a body of the person included in the input image are stacked, a second classification unit for outputting a second classification result for the one or more attributes of the clothing worn by the person included in the input image by applying the mask tensor, generated by the mask generation unit, and a final classification unit for determining and outputting a final classification result for the input image based on the first classification result and the second classification result.

The first classification unit may include a convolutional neural network for extracting features by applying a convolutional filter to the input image, and a fully-connected layer for outputting the first classification result in which the one or more clothing attributes are classified in the features extracted by the convolutional neural network.

The mask generation unit may generate multiple masks, each having a size identical to a size of a two-dimensional (2D) input image.

The second classification unit may include a first convolutional neural network for extracting a first feature tensor by applying a convolutional filter to the input body image, a mask-applied neural network for extracting a second feature tensor by applying the mask tensor to the first feature tensor, a second convolutional neural network for extracting a third feature tensor by applying the convolutional filter to the second feature tensor, and an attention-applied fully-connected layer for outputting the second classification result by applying the mask tensor to the third feature tensor.

The mask-applied neural network may include a resize unit for resizing the input mask tensor so that dimensions of the mask tensor match dimensions of the first feature tensor, a multiplication unit for performing element-wise multiplication of the first feature tensor by the resized mask tensor, multiple convolutional neural network layers for applying a convolutional filter to a tensor output from the multiplication unit, and a pooling layer for resizing a tensor output from the multiple convolutional neural network layers.

The attention-applied fully-connected layer may include a resize unit for resizing the input mask tensor so that dimensions of the mask tensor match dimensions of the third feature tensor, a third convolutional neural network for applying a convolutional filter to the third feature tensor, a multiplication unit for performing element-wise multiplication of a tensor output from the third convolutional neural network by the resized mask tensor, a fourth convolutional neural network for applying a convolutional filter to the third feature tensor, an addition unit for performing element-wise addition of a tensor output from the third convolutional neural network to a tensor output from the multiplication unit, and a fully-connected layer for outputting the second classification result in which the one or more clothing attributes are classified in a tensor output from the addition unit.

The first classification result and the second classification result may be probability values.

The final classification unit may determine a larger value of the first classification result and the second classification result to be the final classification result.

The final classification unit may determine an average of the first classification result and the second classification result to be the final classification result.

The first classification unit and the second classification unit may be respective pre-trained neural networks, and may be configured to determine a learning rate for a first loss of the first classification unit and a learning rate for a second loss of the second classification unit so that a total loss based on the first loss and the second loss improves a reliability of recognition of the outer-layer clothing.

In accordance with another aspect, there is provided a method for classifying clothing attributes based on deep learning, including generating a first classification result for one or more attributes of clothing worn by a person included in an input image, generating a mask tensor in which multiple mask layers respectively corresponding to principal part regions obtained by segmenting a body of the person included in the input image are stacked, generating a second classification result for one or more attributes of the clothing worn by the person included in the input image by applying the generated mask tensor, and determining a final classification result for the input image based on the first classification result and the second classification result.

Generating the first classification result may include extracting features by applying a convolutional filter to the input image, and outputting the first classification result in which the one or more clothing attributes are classified in the extracted features.

Generating the mask tensor may be configured to generate multiple masks, each having a size identical to a size of a two-dimensional (2D) input image.

Generating the second classification result may include extracting a first feature tensor by applying a convolutional filter to the input body image, extracting a second feature tensor by applying the mask tensor to the first feature tensor, extracting a third feature tensor by applying the convolutional filter to the second feature tensor, and applying the mask tensor to the third feature tensor.

Extracting the second feature tensor may include resizing the input mask tensor so that dimensions of the mask tensor match dimensions of the first feature tensor, performing element-wise multiplication of the first feature tensor by the resized mask tensor, applying a convolutional filter to a tensor resulting from the element-wise multiplication, and resizing a tensor resulting from application of the convolutional filter.

Applying the mask tensor to the third feature tensor may include resizing the input mask tensor so that dimensions of the mask tensor match dimensions of the third feature tensor, applying a convolutional filter to the third feature tensor, performing element-wise multiplication of a tensor resulting from application of the convolutional filter by the resized mask tensor, applying a convolutional filter to the third feature tensor, performing element-wise addition of a tensor resulting from application of the convolutional filter to a tensor resulting from the element-wise multiplication, and generating the second classification result in which the one or more clothing attributes are classified in a tensor resulting from the element-wise addition.

The first classification result and the second classification result may be probability values.

Determining the final classification result may be configured to determine a larger value of the first classification result and the second classification result to be the final classification result.

Determining the final classification result may be configured to determine an average of the first classification result and the second classification result to be the final classification result.

In accordance with a further aspect, there is provided an apparatus for training a clothing attribute classification model, including memory for storing at least one program and a clothing attribute classification model, and a processor for executing the program, wherein the clothing attribute classification model includes a first classification unit for outputting a first classification result for one or more attributes of clothing worn by a person included in an input image, a mask generation unit for outputting a mask tensor in which multiple mask layers respectively corresponding to principal part regions obtained by segmenting a body of the person included in the input image are stacked, and a second classification unit for outputting a second classification result for one or more attributes of the clothing worn by the person included in the input image by applying the mask tensor, generated by the mask generation unit, wherein the program trains the clothing attribute classification model, and is configured to determine a learning rate for a first loss of the first classification unit and a learning rate for a second loss of the second classification unit so that a total loss based on the first loss and the second loss improves a reliability of recognition of the outer-layer clothing.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for classifying clothing attributes based on deep learning according to embodiments will be described in detail with reference to FIGS. 1 to 11.

First, typical training data required to train a clothing attribute recognition model and inaccuracy in the results of recognition by the clothing attribute recognition model trained with the typical training data are described below.

Figure 1:
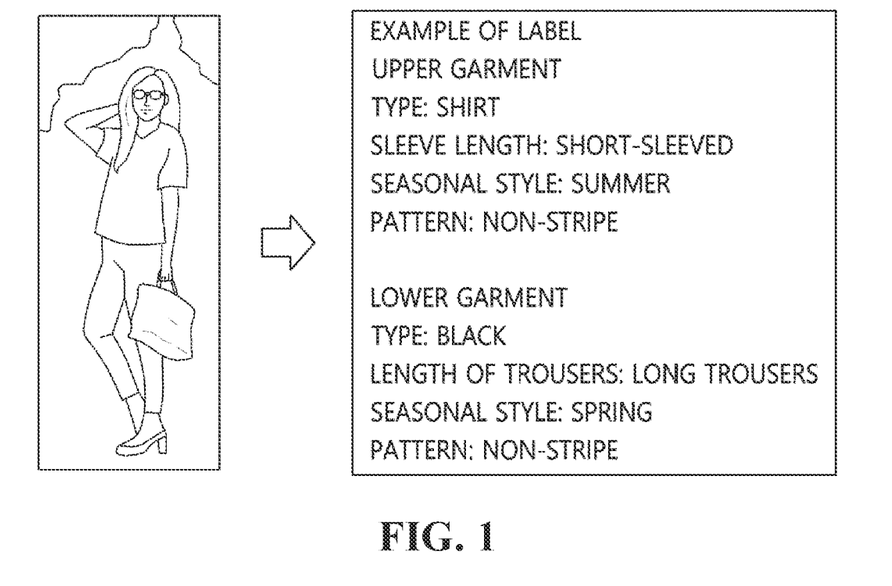
FIG. 1 is a diagram illustrating an example of training data for training a typical clothing attribute recognition model.

FIG. 1 is a diagram illustrating an example of training data for training a typical clothing attribute recognition model.

Referring to FIG. 1, the training data is generally configured such that labels are designated for an image including the entire body of a person, the types of clothing for each of an upper garment and a lower garment worn by the person in the image, and various attributes of the clothing. In this case, as illustrated in FIG. 1, the attributes are classified into multiple categories including the length, seasonal styles, pattern, etc. of clothing, and each attribute has a multi-attribute feature having multiple attribute values.

Therefore, the clothing attribute recognition model trained with such training data is a model for classifying multiple categories and multiple attributes, and is generally trained with a cross-entropy loss function rather than a binary entropy loss function.

Figure 2:
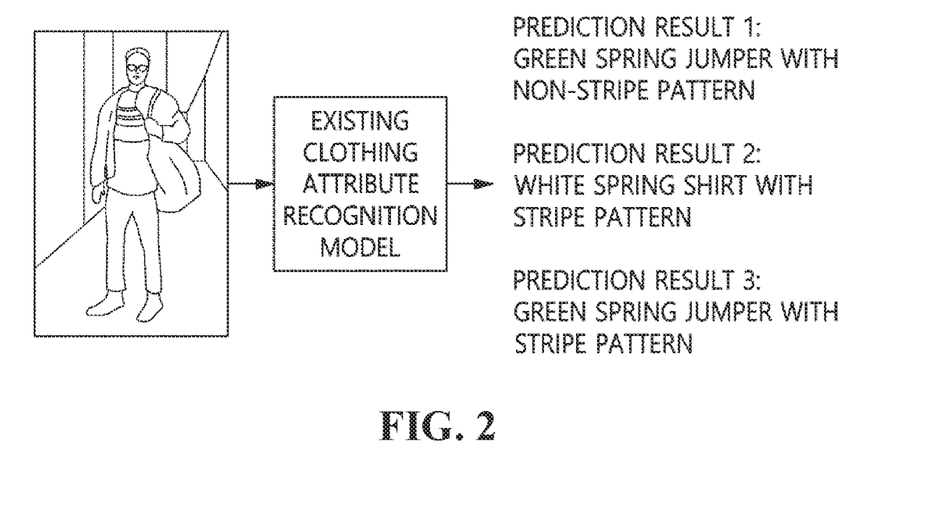
FIG. 2 is a diagram illustrating an example of the results of recognition of clothing attributes in an input image by a typical clothing attribute recognition model.

FIG. 2 is a diagram illustrating an example of the results of recognition of clothing attributes in an input image by a typical clothing attribute recognition model.

Referring to FIG. 2, in the input image, a person wears upper garments in layers, that is, an inner layer corresponding to a white spring shirt with a stripe pattern and an outer layer corresponding to a green spring jumper with a non-stripe pattern.

When such an input image is received, the existing clothing attribute recognition model, which is trained with the training data illustrated in FIG. 1, may output various prediction results depending on the properties of the inner layer and the outer layer.

For example, for the upper garments, various prediction results such as 'green spring jumper with a non-stripe pattern', 'white spring shirt with a stripe pattern', and 'green spring jumper with a stripe pattern', may be output. That is, because the conventional typical training data is not labeled with information about whether the corresponding clothing is an outer layer or an inner layer, unclear prediction results in which the attributes of the outer layer and the inner layer are combined are output, as illustrated in FIG. 2. Therefore, the quality of an application service that uses the conventional clothing attribute recognition model may be deteriorated.

As described above, since the training data for existing clothing attribute recognition has insufficient or no information required in order to classify outer-layer clothing and inner-layer clothing, a deep neural network model trained with such training data recognizes and classifies the clothing as a single upper garment, and then inevitably derives inaccurate prediction results in which the attributes of outer-layer clothing and inner-layer clothing are combined depending on the circumstances.

In order to solve this problem, there may be a scheme for adding label information required in order to classify outer-layer clothing and inner-layer clothing to training data for clothing attribute recognition. However, a problem arises in that a lot of time and manpower are required in order to perform such a label information addition task.

Therefore, in an embodiment, there are proposed an apparatus and method for classifying clothing attributes based on deep learning, which can improve the reliability of recognition when a user wears clothing in layers corresponding to outer-layer clothing and inner-layer clothing, without requiring an additional labeling task.

Figure 3:
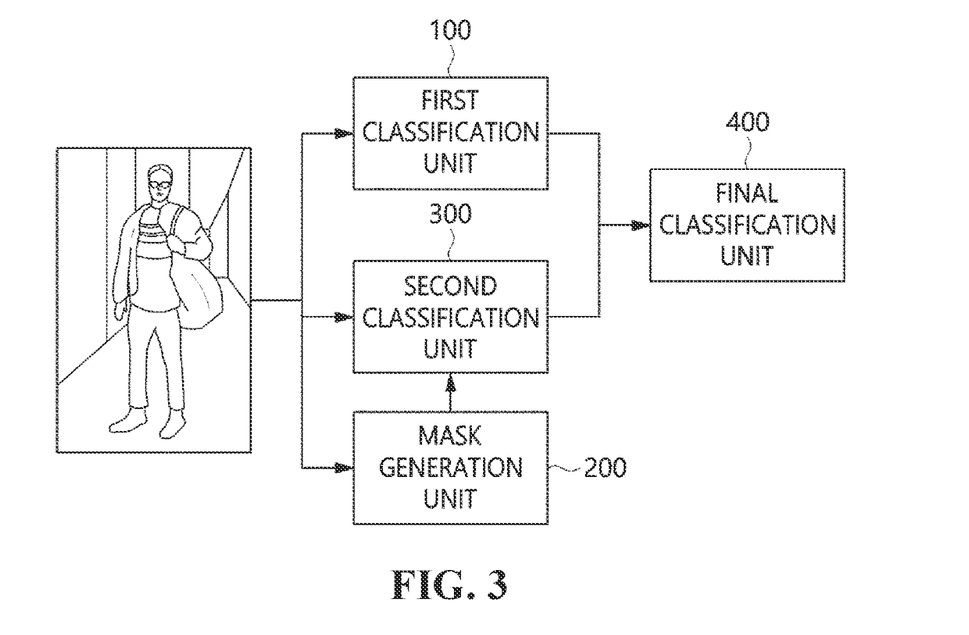
FIG. 3 is a schematic block configuration diagram of an apparatus for classifying clothing attributes based on deep learning according to an embodiment.

FIG. 3 is a schematic block configuration diagram of an apparatus for classifying clothing attributes based on deep learning according to an embodiment.

Referring to FIG. 3, the apparatus for classifying clothing attributes based on deep learning according to the embodiment may include a first classification unit 100, a mask generation unit 200, a second classification unit 300, and a final classification unit 400.

The first classification unit 100 outputs a first classification result for one or more attributes of clothing worn by a person included in an input image.

Here, the input image may be preprocessed such that the body of the person is included in a rectangular frame having a predetermined size.

The details of the first classification unit 100 will be described later with reference to FIGS. 4 and 5.

In an embodiment, the mask generation unit 200 and the second classification unit 300 may be added to the first classification unit 100, whereby the reliability of recognition is improved when a user wears clothing in layers corresponding to outer-layer clothing and inner-layer clothing without requiring an additional labeling task.

The mask generation unit 200 outputs a mask tensor in which multiple mask layers respectively corresponding to principal part regions, obtained by segmenting the body region of the person included in the input image, are stacked.

The second classification unit 300 outputs a second classification result for one or more attributes of clothing worn by the person included in the input image by applying the mask tensor generated by the mask generation unit 200. The details of the mask generation unit 200 and the second classification unit 300 will be described later with reference to FIGS. 6 to 8.

Here, the first classification unit 100 and the second classification unit 300 may be deep neural networks that are pre-trained to improve the reliability of differentiation between outer-layer clothing and inner-layer clothing. The training of the first classification unit 100 and the second classification unit 300 will be described in detail later with reference to FIG. 9.

The final classification unit 400 may determine and output a final classification result for the input image based on the first classification result output from the first classification unit 100 and the second classification result output from the second classification unit 300.

Here, the first classification result and the second classification result may be probability values.

In accordance with an embodiment, the final classification unit 400 may determine the larger one of the first classification result and the second classification result to be the final classification result, as represented by the following Equation (1):

$$\text{final classification result} = \max(\text{first classification result}, \text{second classification result}) \quad (1)$$

For example, when the person wears only outer-layer clothing in the input image, the likelihood that the probability value of the first classification result will be higher than that of the second classification result is increased. In contrast, when the inner-layer clothing inside the outer-layer clothing worn by the person is exposed more, the likelihood that the probability value of the second classification result will be higher than that of the first classification result is increased.

The reason for this is that the second classification result is influenced by attention to the areas of inner-layer clothing and outer-layer clothing for upper garments, so that the area of the outer-layer clothing is strengthened to increase the output value, whereas the first classification result determines both upper garments to be a single feature tensor chunk, so that, when the colors or patterns of outer-layer clothing and inner-layer clothing are different from each other, it is difficult to output a high probability value.

Therefore, in consideration of these characteristics, the final classification unit 400 may set the classification result so that the larger one of the first classification result and the second classification result influences the final classification result.

In accordance with another embodiment, the final classification unit 400 may determine the average of the first classification result and the second classification result to be the final classification result, as represented by the following Equation (2):

$$\text{final classification result} = \text{avg}(\text{first classification result}, \text{second classification result}) \quad (2)$$

This may be used when the final classification result, calculated according to the above-described embodiment, tends to be biased. Here, a number of final classification results identical to the number of attribute categories must be applied.

Figure 4:
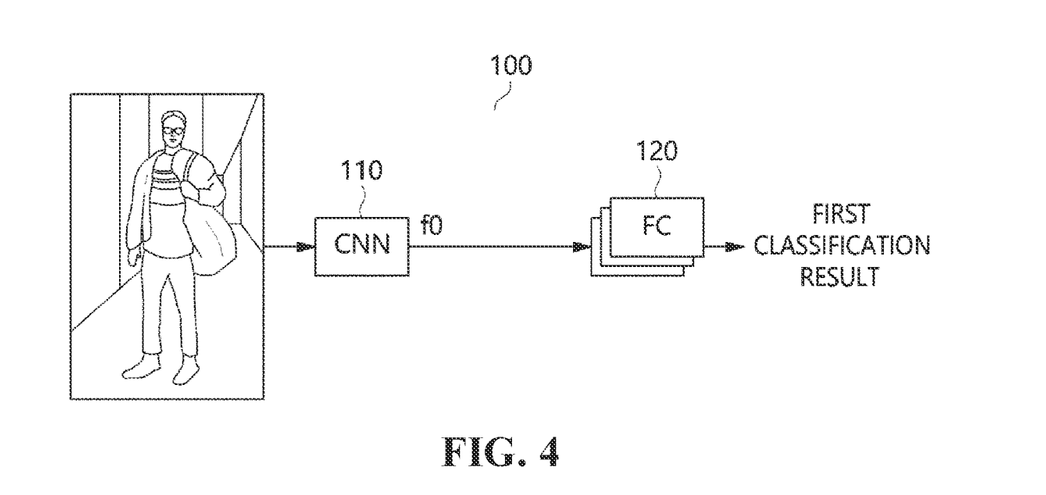
FIG. 4 is a schematic block configuration diagram of a first classification unit according to an embodiment.
Figure 5:
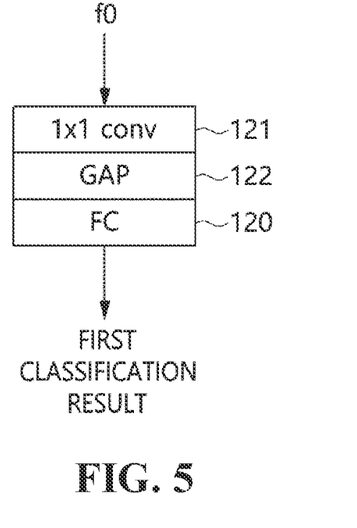
FIG. 5 is a configuration diagram of a fully-connected layer according to an embodiment.

FIG. 4 is a schematic block configuration diagram of a first classification unit according to an embodiment, and FIG. 5 is a configuration diagram of a fully-connected layer according to an embodiment.

Referring to FIG. 4, the first classification unit 100 may include a convolutional neural network (CNN) 110 which extracts features f) by applying a convolutional filter to an input image, and a fully-connected layer (FC) 120 which outputs a first classification result in which one or more clothing attributes are classified in the features f0 extracted by the convolutional neural network 110.

Referring to FIG. 5, a 1×1 convolutional layer 121 and a global average pooling (GAP) layer 122 may be added to an end before the fully-connected layer (FC) 120.

Figure 6:
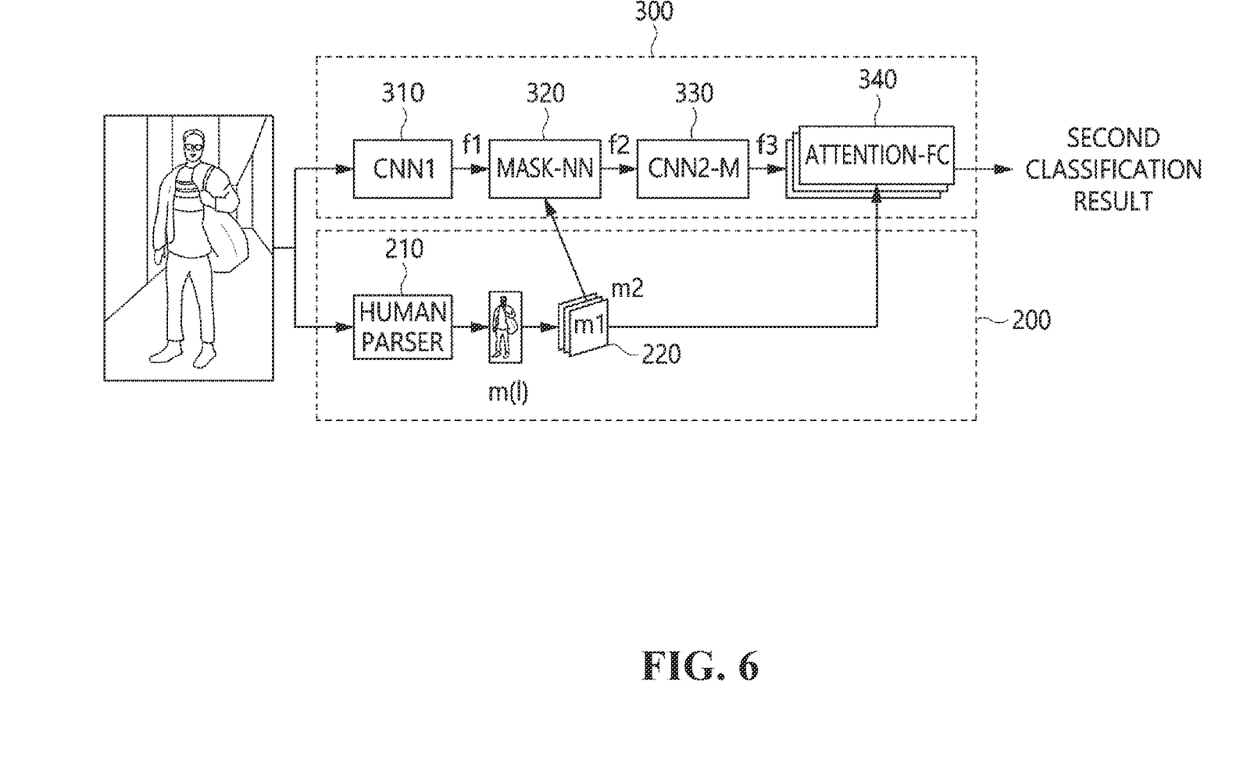
FIG. 6 is a schematic block configuration diagram of a mask generation unit and a second classification unit according to an embodiment.
Figure 7:
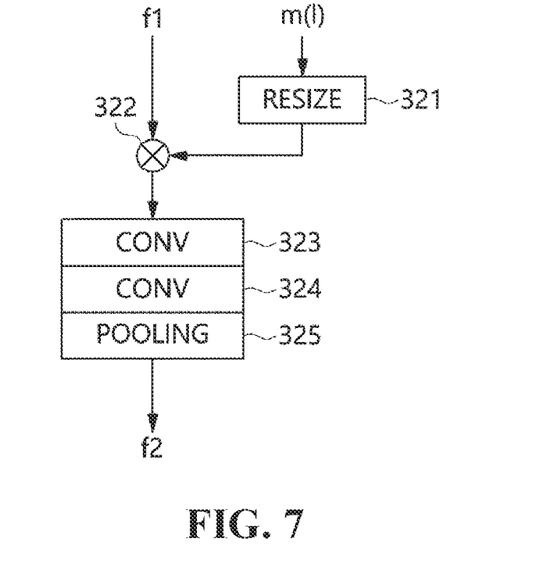
FIG. 7 is a schematic block configuration diagram of a mask-applied neural network according to an embodiment.
Figure 8:
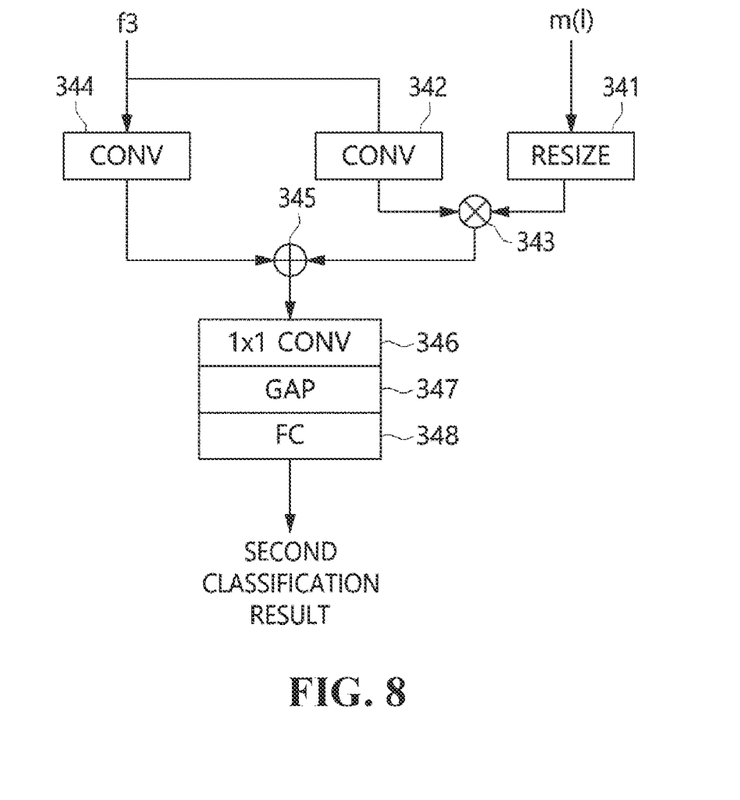
FIG. 8 is a schematic block configuration diagram of an attention-applied fully-connected layer according to an embodiment.

FIG. 6 is a schematic block configuration diagram of a mask generation unit and a second classification unit according to an embodiment, FIG. 7 is a schematic block configuration diagram of a mask-applied neural network according to an embodiment, and FIG. 8 is a schematic block configuration diagram of an attention-applied fully-connected layer according to an embodiment.

Referring to FIG. 6, the mask generation unit 200 may segment an input body image into principal part regions of a body through a human parser 210, and may then output a mask tensor 220 composed of multiple layers.

Here, the human parser 210 may be a model that generates the segmented body part regions in the form of respective masks and satisfies requirements for outputting a tensor in which mask layers are stacked.

Here, each of multiple masks may have a size equal to that of a 2D input image, that is, H×W. Here, H is the vertical size of the input image and W is the horizontal size of the input image. Further, when the number of layers of the generated masks is M, the size of the mask tensor may be H×W×M, corresponding to a three-dimensional (3D) size.

Here, as the mask layers, only layers corresponding to regions of an upper body may be used, or layers corresponding to all components of the entire body may be used, in accordance with an embodiment.

Meanwhile, the second classification unit 300 may include a first convolutional neural network (CNN1) 310 for extracting a first feature tensor f1 by applying a convolutional filter to the input body image, a mask-applied neural network (mask-nn) 320 for extracting a second feature tensor f2 by applying a mask tensor to the first feature tensor f1, a second convolutional neural network (CNN2-$m$) 330 for extracting a third feature tensor f3 by applying a convolutional filter to the second feature tensor f2, and an attention-applied fully-connected layer 340 for outputting the second classification result by applying the mask tensor to the third feature tensor f3.

Unlike the first classification unit 100, the second classification unit 300 according to the embodiment is implemented such that the mask-applied neural network 320 and the second convolutional neural network 330 are added thereto in order to reflect attention in body part regions. Further, the attention-applied fully-connected layer 340 is modified in order to reflect attention, unlike the typical fully-connected layer. That is, the second classification unit 300 according to the embodiment performs an attention process twice using the mask tensor composed of mask layers for respective body part regions, generated by the mask generation unit 200.

This is intended to solve the problem in which features f0 output from the CNN 110 in the first classification unit 100 is configured to have a 2D size corresponding to a small size such as 7×7 and a large channel size, whereby it is difficult to obtain good results due to the low resolution when the mask tensor is applied to the features f1.

Therefore, in an embodiment, in order to reflect the influence of a hierarchical structure including a high resolution layer and a low resolution layer, the mask tensor is primarily applied to the result of the first convolutional neural network 310, which is the initial stage of feature extraction, as described above, and is secondarily applied to the attention-applied fully-connected layer 340. For this, the second classification unit 300 divides one CNN 110 in the first classification unit 100 into two CNNs, namely CNN1 310 and CNN2-$m$ 330, and may insert the mask-applied neural network 320 between the CNNs 310 and 330.

Here, when the CNN layers internally go through a four-step resolution change, it is preferable to apply the mask tensor to a high-resolution tensor that passed the first step. For example, in the CNNs, the first step may be assigned to the CNN1 310, and the second to fourth steps may be assigned to the CNN2-$m$ 330.

Referring to FIG. 7, the mask-applied neural network 320 may include a resize unit 321 for resizing an input mask tensor so that the dimensions of the mask tensor match those of a first feature tensor f1, a multiplication unit 322 for performing element-wise multiplication of the first feature tensor f1 by the resized mask tensor, multiple convolutional neural network layers 323 and 324 for applying a convolutional filter to a tensor output from the multiplication unit 322, and a pooling layer 325 for resizing a tensor output from the multiple convolutional neural network layers.

Referring back to FIG. 6, the second feature tensor f2 output from the mask-applied neural network 320 passes through the second convolutional neural network 330, and thus the third feature tensor f3, which is the final feature tensor before being used in the final attention-applied fully-connected layer 340, is generated. In this way, the third feature tensor f3 may include a weight in which attention to each body part region is reflected, unlike the tensor f0 output from one CNN 110 in the first classification unit 100.

Referring to FIG. 8, the attention-applied fully-connected layer 340 may include a resize unit 341 for resizing an input mask tensor so that the dimensions of the mask tensor match those of the third feature tensor 13, a third convolutional neural network 342 for applying a convolutional filter to the third feature tensor 3, a multiplication unit 343 for performing element-wise multiplication of a tensor output from the third convolutional neural network 342 by the resized mask tensor, a fourth convolutional neural network 344 for applying a convolutional filter to the third feature tensor f3, an addition unit 345 for performing element-wise addition of a tensor, output from the fourth convolutional neural network, to a tensor output from the multiplication unit 343, and a fully-connected layer (FC) 348 for outputting the second classification result in which one or more clothing attributes are classified in a tensor output from the addition unit 345.

Here, referring to FIG. 8, a 1×1 convolutional layer 346 and a global average pooling (GAP) layer 347 may be added to an end before the fully-connected layer (FC) 348.

Here, the attention-applied fully connected layer 340 is configured to add attention depending on the resolution change by adding low-resolution attention to first-step high-resolution attention in the first convolutional neural network 310.

That is, the attention-applied fully-connected layer 340 is configured in a manner different from the mask-applied neural network 320. The reason for this is that the third feature tensor f3 is a low-resolution tensor having a size of about 7×7, so loss of unique tensor information is increased when the mask is applied in the same manner as the mask-applied neural network 320, thus deteriorating learning accuracy.

Therefore, in order to solve this problem, as shown in FIG. 8, the above scheme is strengthened in such a way as to add a tensor in which the influence of mask attention is reflected by applying a concatenation operation with the resized mask tensor so as to additionally consider the influence of the mask while maintaining unique information of f3 by additionally providing the convolutional layer 344 for f3.

Figure 9:
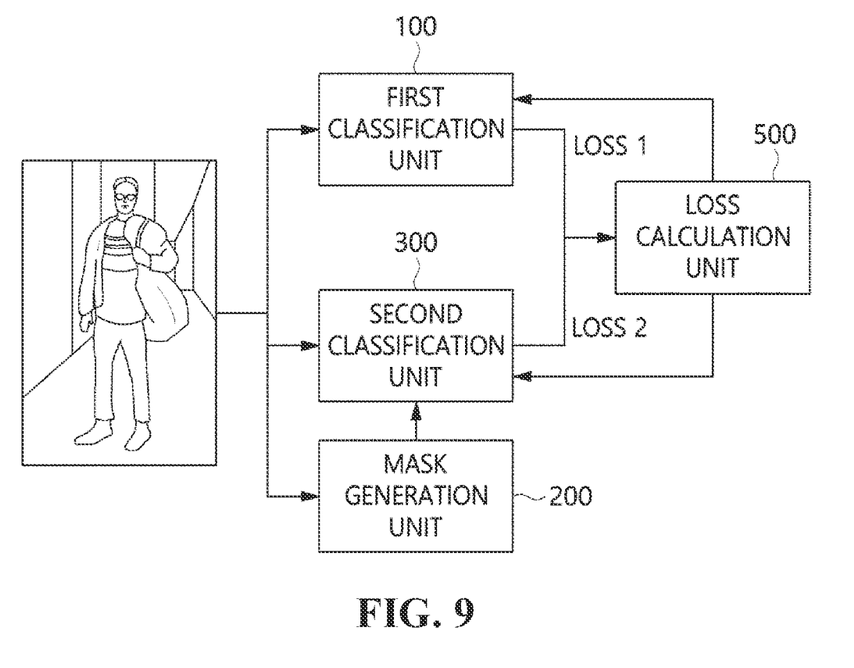
FIG. 9 is a diagram illustrating a learning process by a first classification unit and a second classification unit according to an embodiment.

FIG. 9 is a diagram illustrating a learning process by a first classification unit and a second classification unit according to an embodiment.

Referring to FIG. 9, the above-described first classification unit 100 and second classification unit 300 are previously trained deep-learning models, and neural network parameters are updated to minimize the loss of output of each of the first classification unit 100 and the second classification unit 300.

First loss $loss_1$ of the first classification unit 100 and second loss $loss_2$ of the second classification unit may be calculated using a cross-entropy loss function having multiple attributes within multiple categories.

Here, a loss calculation unit 500 may calculate the total loss based on the $loss_1$ of the first classification unit 100 and the $loss_2$ of the second classification unit 300 using the following Equation (3):

$$loss_{total} = \lambda_1 loss_1 + \lambda_2 loss_2 \qquad (3)$$

Here, a learning rate $\lambda_1$ for the first loss and a learning rate $\lambda_2$ for the second loss may be updated such that the reliability of recognition of outer-layer clothing is improved when a user wears outer-layer clothing and inner-layer clothing in layers. That is, the reliability of recognition of the outer-layer clothing may be improved using a scheme that pays more attention to an outer-layer clothing portion and less attention to an inner-layer clothing portion by segmenting an entire body in an image into body part regions and by combining respective body part regions with type-attribute information of clothing.

Figure 10:
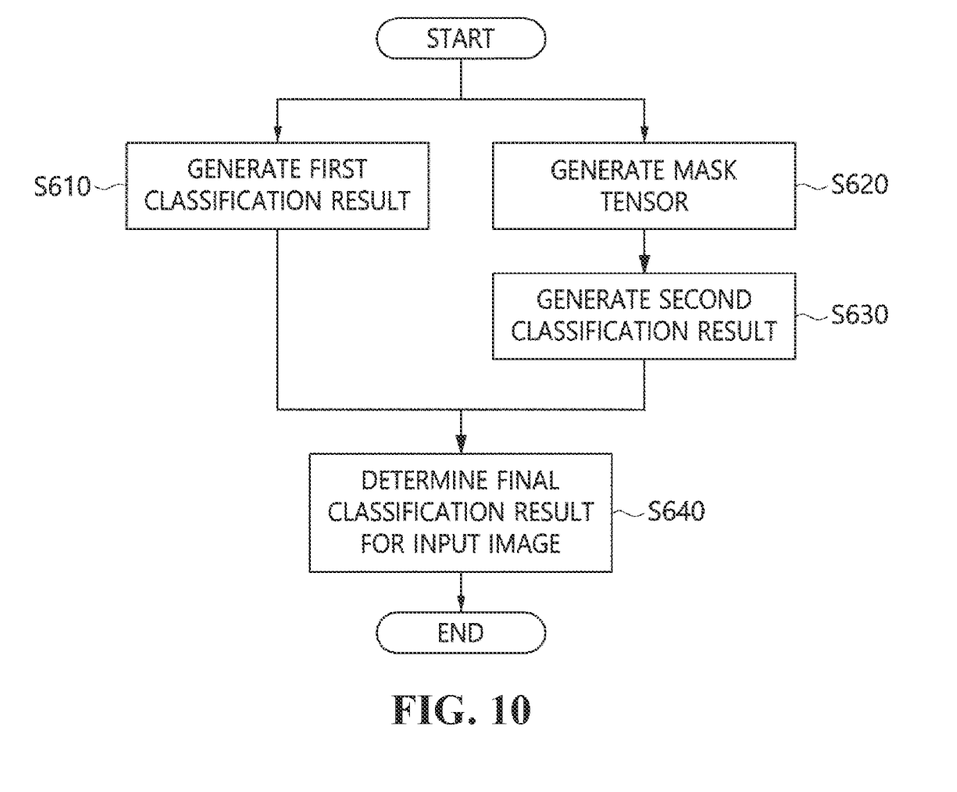
FIG. 10 is a flowchart illustrating a method for classifying clothing attributes based on deep learning according to an embodiment.

FIG. 10 is a flowchart of a method for classifying clothing attributes based on deep learning according to an embodiment.

Referring to FIG. 10, the method for classifying clothing attributes based on deep learning according to the embodiment may include step S610 of generating a first classification result for one or more attributes of clothing worn by a person included in an input image, step S620 of generating a mask tensor in which multiple mask layers corresponding to respective principal part regions, obtained by segmenting a body of the person included in the input image, are stacked, step S630 of generating a second classification result for one or more attributes of the clothing worn by the person included in the input image by applying the mask tensor generated by the mask generation unit, and step S640 of determining a final classification result for the input image based on the first classification result and the second classification result.

Here, step S610 of generating the first classification result may include the step of extracting features by applying a convolutional filter to the input image, and the step of outputting the first classification result in which the one or more clothing attributes are classified in the extracted features.

Here, step S620 of generating the mask tensor may be configured to generate multiple masks, each having a size identical to a size of a two-dimensional (2D) input image.

Here, step S630 of generating the second classification result may include the step of extracting a first feature tensor by applying a convolutional filter to the input body image, the step of extracting a second feature tensor by applying the mask tensor to the first feature tensor, the step of extracting a third feature tensor by applying the convolutional filter to the second feature tensor, and the step of applying the mask tensor to the third feature tensor.

Here, the step of extracting the second feature tensor may include the step of resizing the input mask tensor so that dimensions of the mask tensor match those of the first feature tensor, the step of performing element-wise multiplication of the first feature tensor by the resized mask tensor, the step of applying a convolutional filter to a tensor resulting from the element-wise multiplication, and the step of resizing a tensor resulting from application of the convolutional filter.

Here, the step of applying the mask tensor to the third feature tensor may include the step of resizing the input mask tensor so that dimensions of the mask tensor match those of the third feature tensor, the step of applying a convolutional filter to the third feature tensor, the step of performing element-wise multiplication of a tensor resulting from application of the convolutional filter by the resized mask tensor, the step of applying a convolutional filter to the third feature tensor, the step of performing element-wise addition of a tensor resulting from application of the convolutional filter to a tensor resulting from the element-wise multiplication, and the step of generating the second classification result in which the one or more clothing attributes are classified in a tensor resulting from the element-wise addition.

Here, the first classification result and the second classification result may be probability values.

Here, the step of determining the final classification result may be configured to determine a larger value of the first classification result and the second classification result to be the final classification result.

Here, the step of determining the final classification result may be configured to determine an average of the first classification result and the second classification result to be the final classification result.

Figure 11:
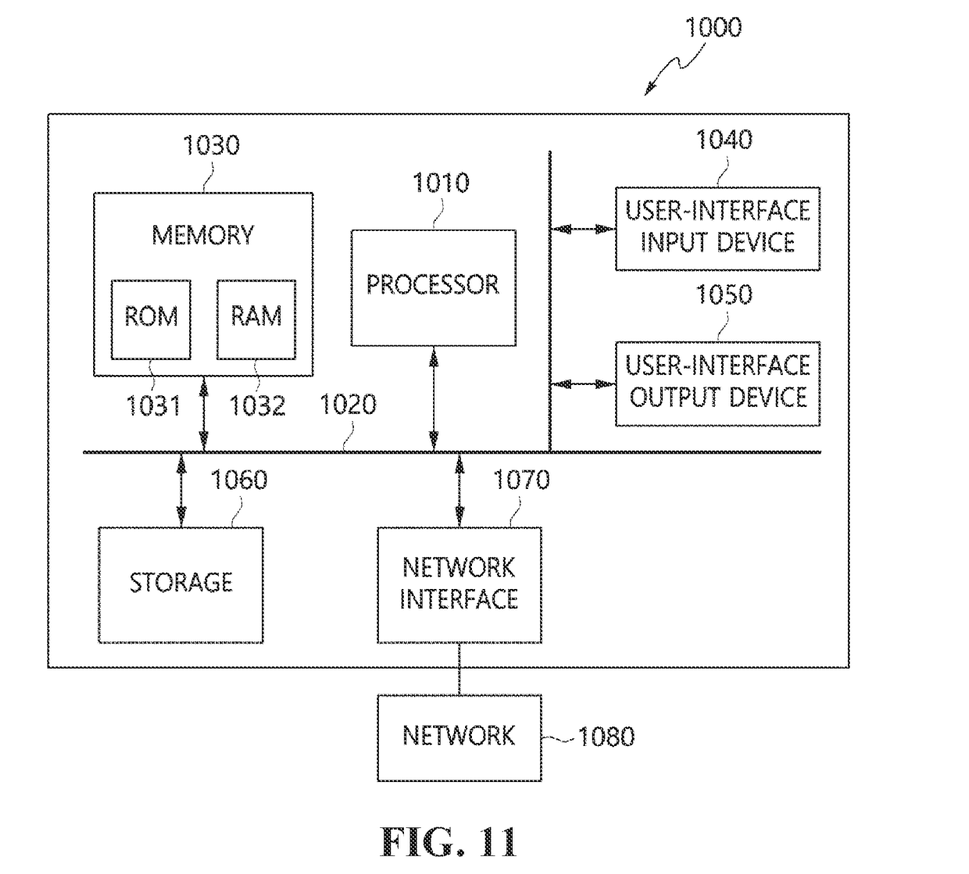
FIG. 11 is a diagram illustrating the configuration of a computer system according to an embodiment.

FIG. 11 is a diagram illustrating the configuration of a computer system according to an embodiment.

An apparatus for classifying clothing attributes based on deep learning according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

The above-described embodiments may improve the results of classification of clothing attributes for an input image in which outer-layer clothing and inner-layer clothing are worn in layers.

The above-described embodiments may propose a deep-learning-based model that is capable of accurately classifying the types and attributes of outer-layer clothing and inner-layer clothing, without additionally tagging labels for distinguishing outer-layer clothing from inner-layer clothing onto existing data for training a model which classifies clothing attributes.

The above-described embodiments may propose a new weakly supervised learning method that is capable of supplementing insufficient information labels through another method while using existing clothing attribute data without change.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for classifying clothing attributes based on deep learning, comprising:
   a memory for storing at least one program; and
   a processor for executing the program,
   wherein the program comprises:
      a first classification unit for outputting a first classification result for one or more attributes of clothing worn by a person included in an input image;
      a mask generation unit for outputting a mask tensor in which multiple mask layers respectively corresponding to principal part regions obtained by segmenting a body of the person included in the input image are stacked;

a second classification unit for outputting a second classification result for the one or more attributes of the clothing worn by the person included in the input image by applying the mask tensor, generated by the mask generation unit; and a final classification unit for determining and outputting a final classification result for the input image based on the first classification result and the second classification result, wherein the final classification unit determines a larger value of the first classification result and the second classification result or an average of the first classification result and the second classification result to be the final classification result to be the final classification result.

2. The apparatus of claim 1, wherein the first classification unit comprises:

a convolutional neural network for extracting features by applying a convolutional filter to the input image; and a fully-connected layer for outputting the first classification result in which the one or more clothing attributes are classified in the features extracted by the convolutional neural network.

3. The apparatus of claim 1, wherein the mask generation unit generates multiple masks, each having a size identical to a size of a two-dimensional (2D) input image.

4. The apparatus of claim 1, wherein the second classification unit comprises:

a first convolutional neural network for extracting a first feature tensor by applying a convolutional filter to the input body image;

a mask-applied neural network for extracting a second feature tensor by applying the mask tensor to the first feature tensor;

a second convolutional neural network for extracting a third feature tensor by applying the convolutional filter to the second feature tensor; and an attention-applied fully-connected layer for outputting the second classification result by applying the mask tensor to the third feature tensor.

5. The apparatus of claim 4, wherein the mask-applied neural network comprises:

a resize unit for resizing the input mask tensor so that dimensions of the mask tensor match dimensions of the first feature tensor;

a multiplication unit for performing element-wise multiplication of the first feature tensor by the resized mask tensor;

multiple convolutional neural network layers for applying a convolutional filter to a tensor output from the multiplication unit; and a pooling layer for resizing a tensor output from the multiple convolutional neural network layers.

6. The apparatus of claim 4, wherein the attention-applied fully-connected layer comprises:

a resize unit for resizing the input mask tensor so that dimensions of the mask tensor match dimensions of the third feature tensor;

a third convolutional neural network for applying a convolutional filter to the third feature tensor;

a multiplication unit for performing element-wise multiplication of a tensor output from the third convolutional neural network by the resized mask tensor;

a fourth convolutional neural network for applying a convolutional filter to the third feature tensor;

an addition unit for performing element-wise addition of a tensor output from the third convolutional neural network to a tensor output from the multiplication unit; and a fully-connected layer for outputting the second classification result in which the one or more clothing attributes are classified in a tensor output from the addition unit.

7. The apparatus of claim 1, wherein the first classification result and the second classification result are probability values.

8. The apparatus of claim 1, wherein the first classification unit and the second classification unit are respective pre-trained neural networks, and are configured to determine a learning rate for a first loss of the first classification unit and a learning rate for a second loss of the second classification unit so that a total loss based on the first loss and the second loss improves a reliability of recognition of the outer-layer clothing.

9. A method for classifying clothing attributes based on deep learning, comprising:

generating a first classification result for one or more attributes of clothing worn by a person included in an input image;

generating a mask tensor in which multiple mask layers respectively corresponding to principal part regions obtained by segmenting a body of the person included in the input image are stacked;

generating a second classification result for one or more attributes of the clothing worn by the person included in the input image by applying the generated mask tensor; and determining a final classification result for the input image based on the first classification result and the second classification result, wherein determining the final classification result is configured to determine a larger value of the first classification result and the second classification result or an average of the first classification result and the second classification result to be the final classification result.

10. The method of claim 9, wherein generating the first classification result comprises:

extracting features by applying a convolutional filter to the input image; and outputting the first classification result in which the one or more clothing attributes are classified in the extracted features.

11. The method of claim 9, wherein generating the mask tensor is configured to generate multiple masks, each having a size identical to a size of a two-dimensional (2D) input image.

12. The method of claim 9, wherein generating the second classification result comprises:

extracting a first feature tensor by applying a convolutional filter to the input body image;

extracting a second feature tensor by applying the mask tensor to the first feature tensor;

extracting a third feature tensor by applying the convolutional filter to the second feature tensor; and applying the mask tensor to the third feature tensor.

13. The method of claim 12, wherein extracting the second feature tensor comprises:

resizing the input mask tensor so that dimensions of the mask tensor match dimensions of the first feature tensor;

performing element-wise multiplication of the first feature tensor by the resized mask tensor;

applying a convolutional filter to a tensor resulting from the element-wise multiplication; and resizing a tensor resulting from application of the convolutional filter.

14. The method of claim 12, wherein applying the mask tensor to the third feature tensor comprises:

resizing the input mask tensor so that dimensions of the mask tensor match dimensions of the third feature tensor;

applying a convolutional filter to the third feature tensor;

performing element-wise multiplication of a tensor resulting from application of the convolutional filter by the resized mask tensor;

applying a convolutional filter to the third feature tensor;

performing element-wise addition of a tensor resulting from application of the convolutional filter to a tensor resulting from the element-wise multiplication; and generating the second classification result in which the one or more clothing attributes are classified in a tensor resulting from the element-wise addition.

15. The method of claim 9, wherein the first classification result and the second classification result are probability values.

16. An apparatus for training a clothing attribute classification model, comprising:

a memory for storing at least one program and a clothing attribute classification model; and a processor for executing the program, wherein the clothing attribute classification model comprises:

a first classification unit for outputting a first classification result for one or more attributes of clothing worn by a person included in an input image;

a mask generation unit for outputting a mask tensor in which multiple mask layers respectively corresponding to principal part regions obtained by segmenting a body of the person included in the input image are stacked; and a second classification unit for outputting a second classification result for one or more attributes of the clothing worn by the person included in the input image by applying the mask tensor, generated by the mask generation unit, wherein the program trains the clothing attribute classification model, and is configured to determine a learning rate for a first loss of the first classification unit and a learning rate for a second loss of the second classification unit so that a total loss based on the first loss and the second loss improves a reliability of recognition of the outer-layer clothing wherein the final classification unit determines a larger value of the first classification result and the second classification result or an average of the first classification result and the second classification result to be the final classification result to be the final classification result.

* * * * *